Figure 3:
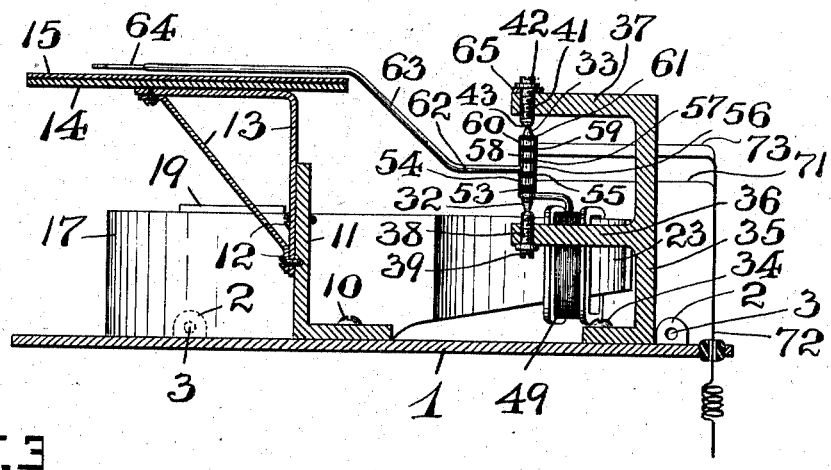

J. L. ZANDER.
DIFFERENTIAL GALVANOMETER.
APPLICATION FILED MAR. 16, 1910.
967,597.
Patented Aug. 16, 1910.
3 SHEETS—SHEET 1.
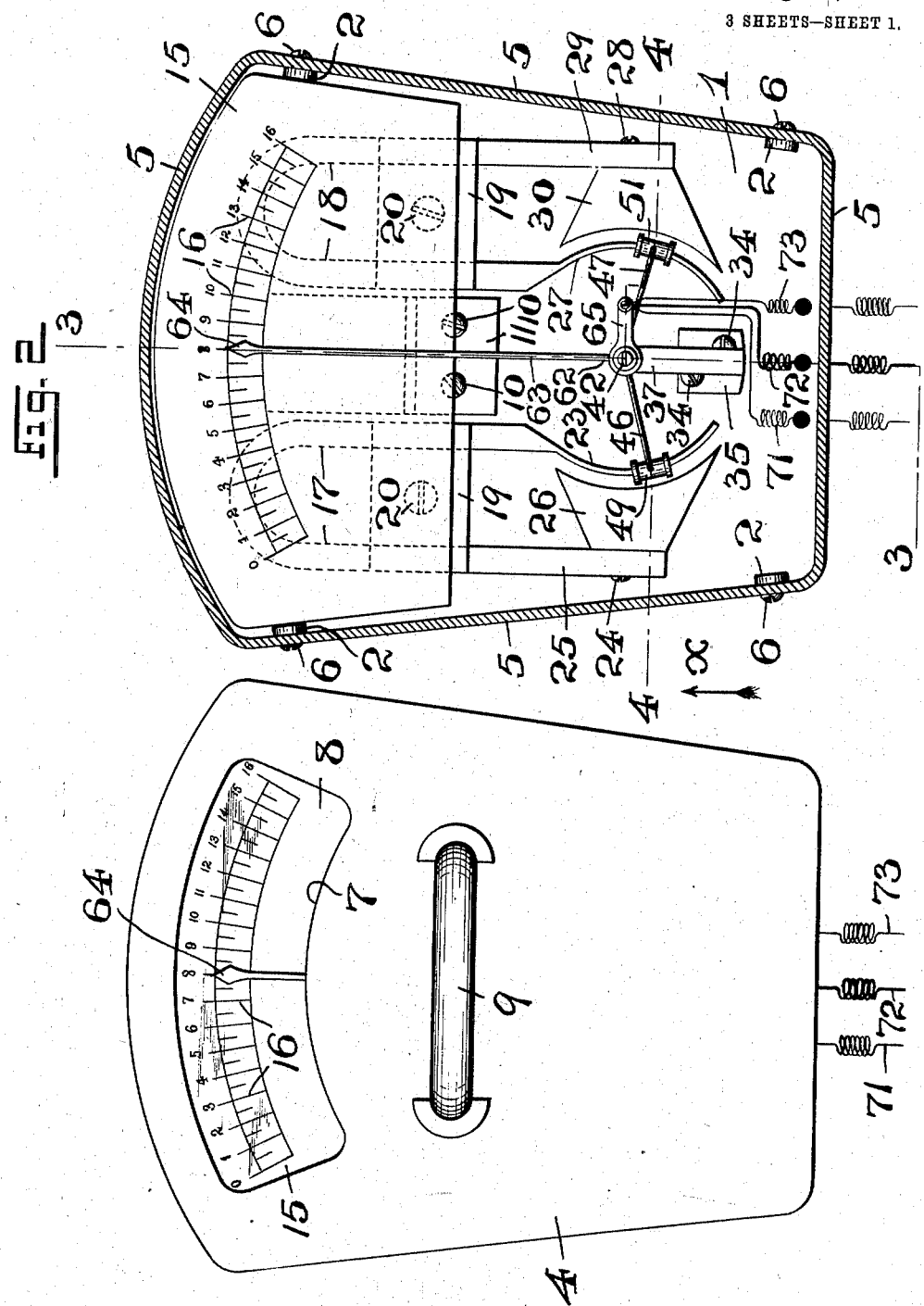
WITNESSES:
Fredk. H. W. Fraentzel
Anna H. Alter
INVENTOR:
John L. Zander,
BY
Fraentzel and Richards,
ATTORNEYS

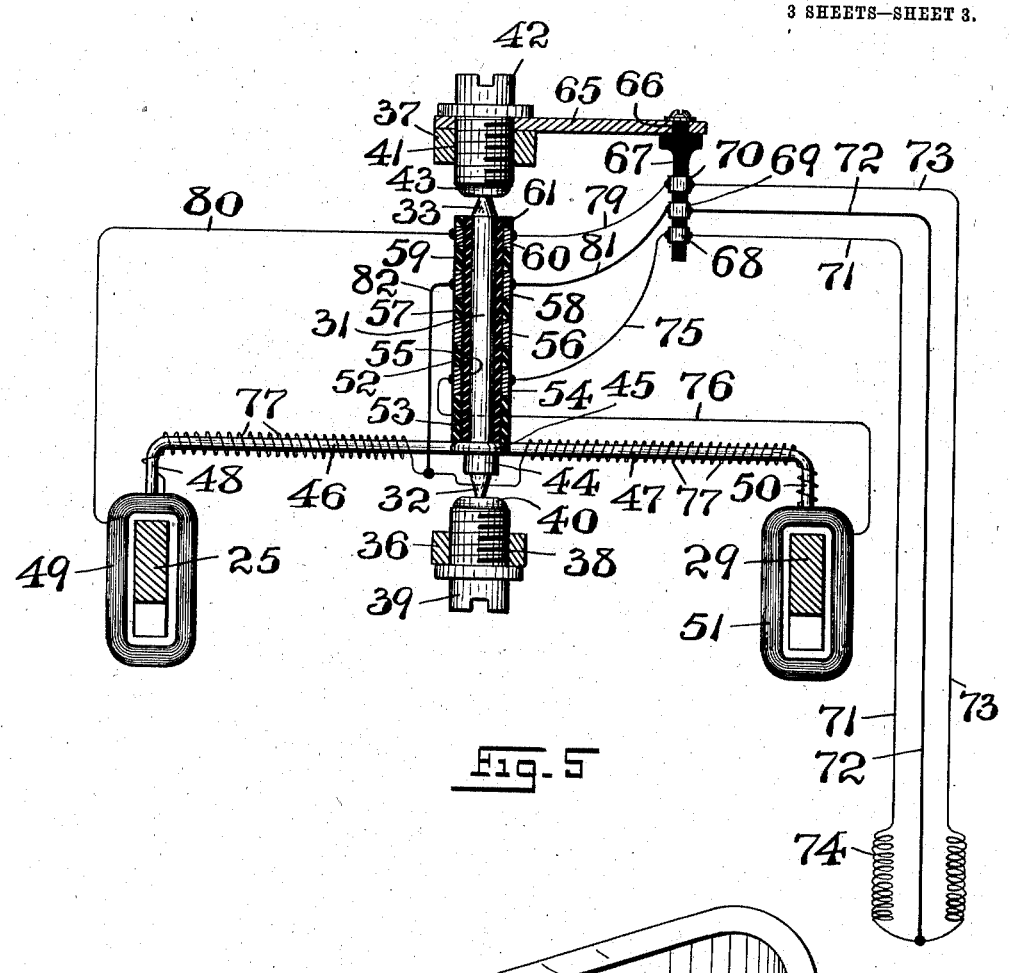
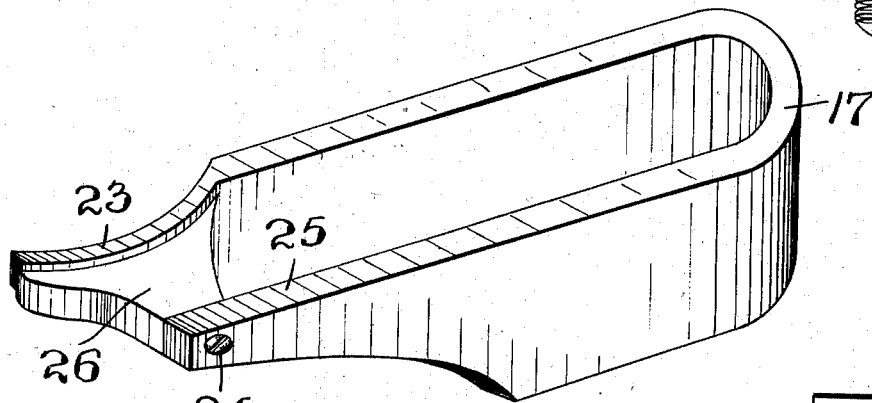

UNITED STATES PATENT OFFICE.

JOHN L. ZANDER, OF NEWARK, NEW JERSEY.

DIFFERENTIAL GALVANOMETER.

967,597.    Specification of Letters Patent.    Patented Aug. 16, 1910.

Application filed March 16, 1910. Serial No. 549,750.

*To all whom it may concern:*

Be it known that I, JOHN L. ZANDER, a citizen of the United States, residing at Newark, in the county of Essex and State of New Jersey, have invented certain new and useful Improvements in Differential Galvanometers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in electrical measuring instruments; and, the invention relates, more particularly, to an improved differential galvanometer of the general character hereinafter more fully specified, and the invention is in the nature of improvements in a similar device filed by me May 21, 1909 and numbered 497,419.

The present invention has for its principal object to provide a portable electrical measuring instrument which is especially adapted for heat-measurements, and which comprises a pair of magnets of a peculiar construction, and a wire-wound coil moving relatively to a pole-piece of each magnet, the end-portions forming the pole-pieces of the magnets being reduced or tapered to a substantially small point, so that all the magnetic lines of force are concentrated at the immediate point of use, and which is the place where the wire wound-coil moves.

This invention has for its further object to provide a novel construction of magnet consisting of a large mass or body of magnetic material, which is reduced or made to taper at its end-portions or poles for the purpose of concentrating all the lines of the magnetic force of a large body or mass to the point where the magnetic action is most desired; and, the invention has for its further object to provide a novel construction of horse-shoe magnet, in which the space between the two poles of the magnet has been reduced to a minimum, with as small an air-gap as possible, which means highest efficiency, the space between the two pole-ends of the magnet being just large enough to permit of the free movement of the coil between the said two pole-ends.

Other objects of this invention not at this time more particularly enumerated will be clearly understood from the following detailed description of this invention.

With the various objects of the present invention in view, the said invention consists, primarily, in the novel electrical measuring instrument hereinafter set forth, and a novel magnet therefor; and, the invention consists, furthermore, in the novel arrangements and combinations of the various devices and parts, as well as in the details of the construction of the same, all of which will be more particularly described in the following specification, and then finally embodied in the clauses of the claims which are appended to and which form an essential part of this specification.

The invention is clearly illustrated in the accompanying drawings, in which:—

Figure 4:
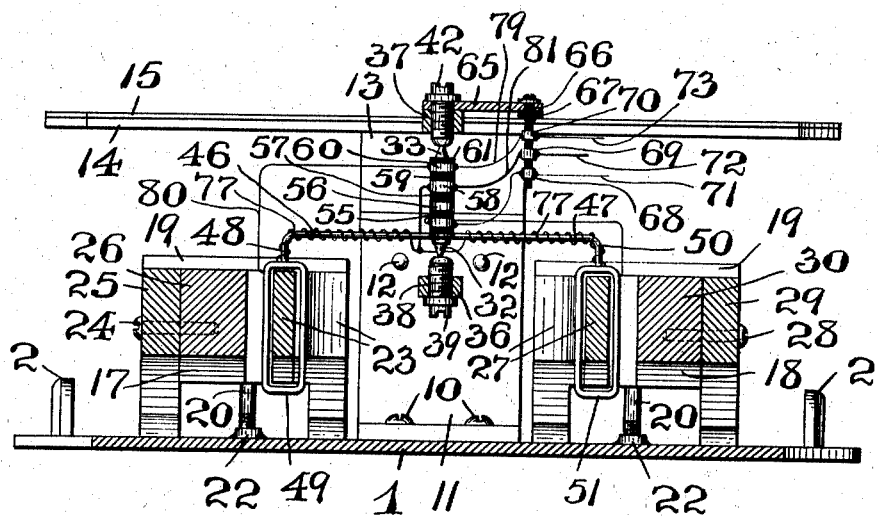

Figure 1 is a plan view of a portable electrical measuring instrument showing one embodiment of the principles of the present invention; and Fig. 2 is a horizontal sectional representation of an inclosing body or case of the instrument, the mechanism within said body or case being represented in plan or top view. Fig. 3 is a transverse vertical section of the device, said section being taken on line 3—3 in said Fig. 2, with the top-element or cover of the device omitted from said view; and Fig. 4 is a cross-section of the device, said section being taken on line 4—4 in said Fig. 2, looking in the direction of the arrow *x*. Fig. 5 is a detail view, partly in cross-section and partly in elevation, said view being made on an enlarged scale, and showing diagrammatically a pair of pole-members of the same polarity of a pair of magnets, and a pair of coils moving relatively to said pole-pieces, a spindle, bearings in which the ends of said spindle are mounted, a supporting arm or lever mounted upon said spindle, from each free end of which is suspended a coil, the said view showing in connection therewith an arrangement of the circuit-wires leading to and connected with a thermo-electric couple, or other electrical resistance - producing source. Fig. 6 is a perspective view of one of the magnets employed in the electrical measuring instrument, said view being made on an enlarged scale.

Similar characters of reference are employed in all of the above described views, to indicate corresponding parts.

Referring now to the said figures of the drawings, the reference-character 1 indicates a suitable base which may be of any suitable marginal configuration, and may be provided at suitable points at or near the marginal edge-portions of said base with upwardly extending lugs or ears, as 2, said lugs or ears being formed with screw-threaded holes 3. Suitably arranged upon the said base is a cover, as 4, the downwardly depending sides 5 thereof registering with the said lugs or ears, substantially as shown in Fig. 2 of the drawings, and being suitably secured thereto by means of screws 6. In its upper face, the said cover is provided, at a desirable point, with a suitably formed reading-opening, as 7, back of which is a glass 8 which is suitably secured to the inner side of said upper face of the cover. If desired, the said upper face of the cover may also be provided with a suitably formed handle, as 9, for handling and carrying about the box or case which is formed when the said cover 4 has been attached to said base 1 by means of the screws 6. Suitably secured upon said base, by means of screws 10, or any other suitable fastening devices, is a standard or post-like element 11, to which is attached by means of screws 12, or other suitable fastening means, a suitably formed bracket, as 13, upon which is mounted a plate 14. This plate is located beneath the previously mentioned reading-opening 7, and carries a member or element 15 which is suitably secured upon the upper face of the said plate 14, and has a scale or other suitable divisions or graduations 16 formed thereon, as clearly represented in Figs. 1 and 2 of the drawings. Located upon the opposite sides of the said standard or post-like element 11 are a pair of horse-shoe magnets 17 and 18, each magnet being firmly secured in its operative position upon the said base 1 by means of a perforated plate 19 and the screws 20, said screws having their screw-threaded shank-portions 21 screwed into screw-threaded bosses 22 with which the base 1 is provided, in the manner indicated in Figs. 2 and 4 of the drawings.

The horse-shoe magnet 17 is made with a suitably curved or arc-shaped end-member 23, forming one of the poles of the said magnet, and suitably secured by means of screws 24, or other suitable fastening means, to the other pole-member 25 of the horse-shoe magnet is a block 26, which is formed with a concave surface-portion conforming to the convexed part of the end-member 23, substantially as shown, and the said block forming the other pole of the magnet 17. As shown, both the pole-portions of the magnets 17 are reduced or made tapered, so as to produce a magnet consisting of a large mass or body of magnetic material having the reduced pole-ends, for the purpose of concentrating all the lines of the magnetic force of a large body or mass to the point where the magnetic action is most desired. In a like manner, the other horse-shoe magnet 18 is made with a suitably curved or arc-shaped end-member 27, forming one of the poles of the said magnet, and suitably secured by means of screws 28, or other suitable fastening means, to the pole-member 29 of the said horse-shoe magnet 18 is a block 30, which is also formed with a concave surface-portion conforming to the convexed part of the said end-member 27, substantially as shown, and the said block forming the other pole of said magnet 18. Both the pole-portions of this magnet 18 are also reduced or made tapered, for the same purpose herein-above stated in the foregoing description in connection with the magnet 17.

As shown in said Fig. 2 of the drawings, the two horse-shoe magnets 17 and 18 are arranged and secured upon the base 1 in such a manner, that the two concave surface-portions of the two pole-members 23 and 27, which are of the same polarity, are placed opposite each other in such a manner, so as to form two arcs of a circle, the center of which is in the vertical longitudinal central axis of a spindle 31. This spindle 31 is made at its ends with the pointed pivots or end-portions 32 and 33.

Suitably secured upon the base 1, by means of screws 34, or other fastening devices, is a post-like member or standard 35 which is provided with a pair of rearwardly extending arms 36 and 37. The said arm 36 is formed with a screw-threaded hole 38 in which is adjustably arranged a screw-threaded bearing-plug 39, said plug being preferably provided in its end-portion with a jewel-bearing 40. In a like manner, the said arm 37 is formed with a screw-threaded hole 41 in which is adjustably arranged a screw-threaded bearing-plug 42 which is preferably provided in its end-portion with a jewel-bearing 43. As shown, the pointed pivots or end-portions 32 and 33 of the spindle 31 are mounted between the said jewel-bearings 40 and 43, so that the spindle 31 and the parts connected therewith will have a free oscillatory movement, as will be clearly evident. As shown, the said spindle 31 is provided with an enlarged portion, as 44, and resting upon the shoulder formed by said enlarged portion and also suitably secured upon said spindle, so as to oscillate with the same, is an eye-portion 45 from which extend in opposite directions suitable carriers or arms 46 and 47. Extending downwardly from the free end-portion of said carrier or arm 46 is an extension 48 which carries a suitable wire-wound coil 49; and, likewise, extending downwardly from the free end-portion of the carrier or arm 47 is an extension 50 which carries a suitable wire-wound coil 51. The said coil 49 encompasses and is movably mounted upon the curved or arc-shaped pole-member 23 of the magnet 17, and the coil 51 encompasses and is movably mounted upon the curved or arc-shaped pole-member 27 of the magnet 18. Suitably mounted upon said spindle 31 is a tubular member or sleeve 52 of a suitable insulating or non-conducting material, and mounted upon said tubular member or sleeve 52, are other sleeves or rings 53, 54, 55, 56, 57, 58, 59, 60 and 61, the said sleeves or rings 53, 55, 57, 59 and 61 being made of insulating or non-conducting material, while the rings 54, 56, 58 and 60 are made of metal, so as to be good conductors of electricity. Extending from said sleeve or ring 56 is a suitably formed index-hand 62 which is made with a suitably bent part 63 and terminates in a pointer 64 which is movably arranged above the previously mentioned plate 14 and the member 15, and which pointer moves directly over and above the divisions or graduations 16 of the scale with which said member 15 is provided.

Resting upon and extending laterally from the arm 37, and suitably fixed to said arm by means of the screw-threaded bearing-plug 39, is a plate or bar 65, the said plate or bar being formed with a hole or perforation 66 in which is suitably secured an end-portion of a downwardly extending stem 67 which is made of a suitable insulating or non-conducting material. Suitably mounted in fixed positions upon said stem 67 are three metal rings or sleeves 68, 69 and 70. Connected with an extension from the said respective rings 68, 69 and 70 are the three circuit-wires 71, 72 and 73, in electrical circuit with which is a suitable device, as a thermo-couple, or other electrical resistance, as 74, and indicated diagrammatically in the drawings. The sleeves 68 and 54 are placed in circuit by means of a circuit-wire 75, and extending from the sleeve 54 is a circuit-wire 76 which is connected with the coil 51. Connected with and extending from said coil 51 is a circuit-wire 77 which may be wound around the carriers or arms 47 and 46 and is connected at its other end with the coil 49. Connected with and extending from the opposite end of said coil 49 is a circuit-wire 78 which is connected at its opposite free end to the sleeve 60. The two sleeves 60 and 70 are suitably connected by means of a circuit-wire 79, to complete the electrical circuit through the wire 73. The differential circuit is established by means of the heavy circuit-wire 81 between the sleeves 69 and 58, and the heavy circuit-wire 82 connected with the sleeve 58 at its one end, and at its other end with the circuit-wire 77 which is placed between and connects the two coils 51 and 49, all of which will be clearly evident from an inspection of Fig. 5 of the drawings.

Of course it will be understood, that all the circuit-wires are suitably covered with an insulating material.

The operation and workings of the several parts of the electrical measuring device or apparatus herein-before described will be clearly understood from an inspection of said Fig. 5 of the drawings, and need, therefore, not be further described.

That the index-hand may be properly balanced, the two carriers or arms 36 and 37 are angularly arranged, with relation to each other, substantially in the manner illustrated in said Fig. 2 of the drawings.

I am aware that some changes may be made in the general arrangements and combinations of the various devices and parts, as well as in the details of the construction of the same, without departing from the scope of this invention as defined in the claims, which are appended to the said specification. Hence, I do not limit my present invention to the exact arrangements and combinations of the devices and parts as set forth in the said specification, nor do I confine myself to the exact details of the construction of the said parts as illustrated in the accompanying drawings.

I claim:—

1. In an electrical measuring instrument, a pair of horse-shoe magnets, a wire-wound coil encircling a pole-member of each magnet and moving relatively to said pole-member, and the pole-members of said magnets tapering toward the pole-ends, substantially as and for the purposes set forth.

2. In an electrical measuring instrument, a pair of horse-shoe magnets, each magnet being formed with an arc-shaped pole-member, said arc-shaped pole-members being of like polarity, a spindle placed between said arc-shaped pole-members, a support connected with and extending from said spindle, wire-wound coils carried by said support, each coil encircling an arc-shaped pole-member and moving relatively to said pole-member, and the pole-members of said magnets tapering toward the pole ends, substantially as and for the purposes set forth.

3. In an electrical measuring instrument, a pair of horse-shoe magnets, each magnet being formed with an arc-shaped pole-member, a spindle placed between said arc-shaped pole-members, a supporting rod mounted upon said spindle, a wire-wound coil suspended from each end of said rod, each coil encircling an arc-shaped pole-member and moving relatively to said pole-member, alternating sleeves of metal and insulating material upon said spindle, and circuit-wires connecting said metal sleeves in circuit with said wire-wound coils, and the pole-members of said magnets tapering toward the pole-ends, substantially as and for the purposes set forth.

4. In an electrical measuring instrument, a pair of horse-shoe magnets, each magnet being formed with an arc-shaped pole-member, a spindle placed between said arc-shaped pole-members, an index-hand mounted upon and extending rearwardly from said spindle, a supporting rod mounted upon said spindle, said rod comprising a pair of arms angularly arranged with relation to each other and extending forwardly of said spindle, so as to counterbalance the said index-hand, and a coil supported by each arm, substantially as and for the purposes set forth.

5. In an electrical measuring instrument, a pair of horse-shoe magnets, each magnet being formed with an arc-shaped pole-member, a spindle placed between said arc-shaped pole-members, an index-hand mounted upon and extending rearwardly from said spindle, a supporting rod mounted upon said spindle, said rod comprising a pair of arms angularly arranged with relation to each other and extending forwardly of said spindle, so as to counterbalance the said index-hand, a coil supported by each arm, and the pole-members of said magnets tapering toward the pole-ends, substantially as and for the purposes set forth.

6. A horse-shoe magnet comprising a pair of pole-members, one of said pole-members being made arc-shaped, and the other pole-member being straight, a block secured to the pole-end of said straight pole-member, said block being provided with a concave portion conforming to the convex portion of said arc-shaped pole-member, and both of said pole-members tapering toward the pole-ends, substantially as and for the purposes set forth.

In testimony, that I claim the invention set forth above I have hereunto set my hand this 14th day of March, 1910.

JOHN L. ZANDER.

Witnesses:
FRED. K. C. FRAENTZEL,
FREDK. H. W. FRAENTZEL.